No. 772,068. PATENTED OCT. 11, 1904.
J. M. SWEET.
MACHINE FOR SETTING RUBBER TIRES.
APPLICATION FILED JULY 17, 1903.
NO MODEL. 2 SHEETS—SHEET 1.
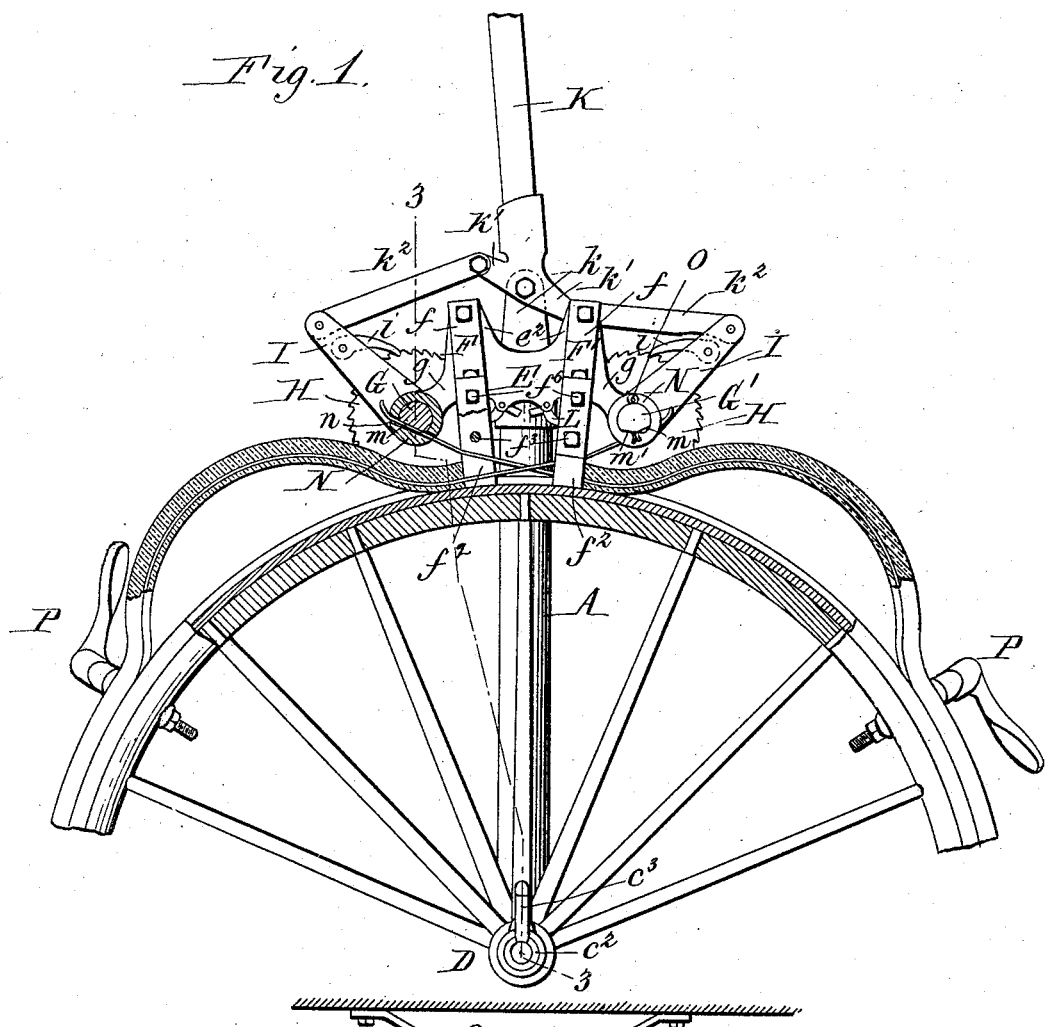
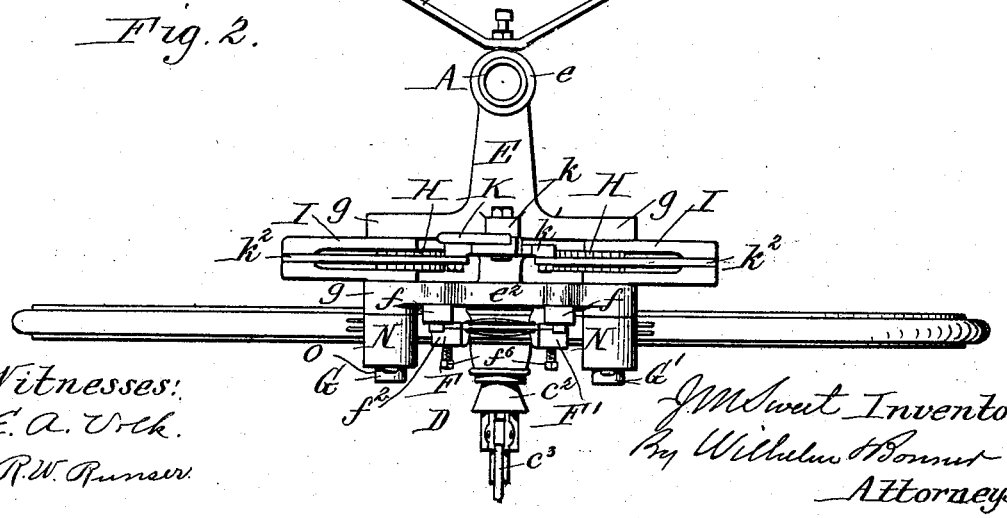
Witnesses:
E. A. Volk.
R. W. Runser.
J. M. Sweet, Inventor.
By Wilhelm Bonner
Attorneys.

No. 772,068. PATENTED OCT. 11, 1904.
J. M. SWEET.
MACHINE FOR SETTING RUBBER TIRES.
APPLICATION FILED JULY 17, 1903.
NO MODEL. 2 SHEETS—SHEET 2.
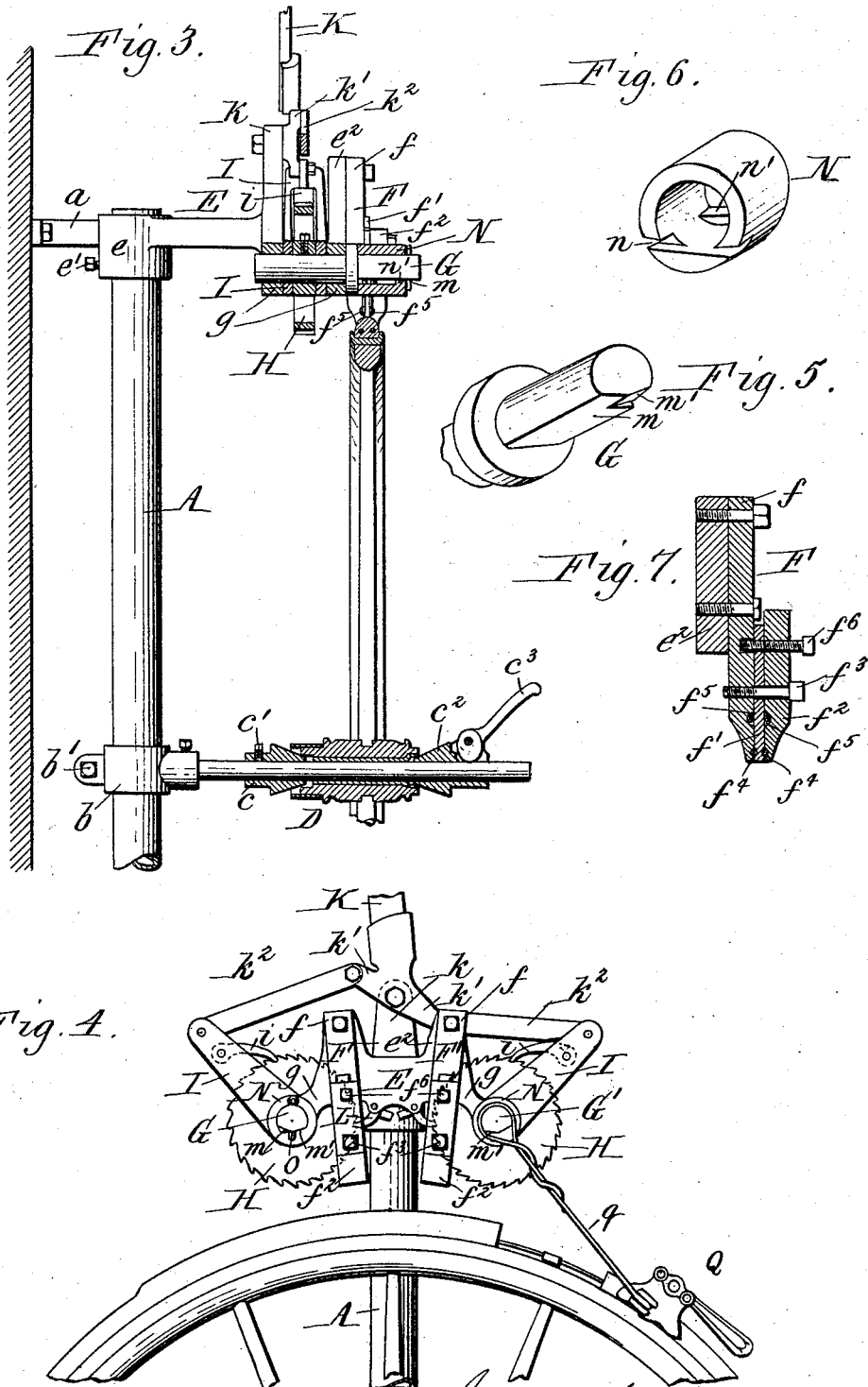
Witnesses: E. A. Volk. R. W. Runser.
John M. Sweet, Inventor.
By Wilhelm & Bonner, Attorneys.

No. 772,068. Patented October 11, 1904.

UNITED STATES PATENT OFFICE.

JOHN M. SWEET, OF BATAVIA, NEW YORK, ASSIGNOR TO THE SWEET TIRE AND RUBBER COMPANY, OF BATAVIA, NEW YORK, A CORPORATION.

MACHINE FOR SETTING RUBBER TIRES.

SPECIFICATION forming part of Letters Patent No. 772,068, dated October 11, 1904.

Application filed July 17, 1903. Serial No. 165,958. (No model.)

*To all whom it may concern:*

Be it known that I, JOHN M. SWEET, a citizen of the United States, residing at Batavia, in the county of Genesee and State of New York, have invented new and useful Improvements in Machines for Setting Rubber Tires, of which the following is a specification.

This invention relates to a rubber-tire-setting machine, and more particularly to a machine for setting or applying a tire of that kind which is retained in a channeled metal rim by one or more wires or bands passing circumferentially around the wheel in longitudinal holes in the rubber tire. In applying a tire of this character to the wheel the tire is cut somewhat longer than necessary to encircle the wheel and with the retaining-wires in place the tire is placed around the wheel. The ends of the rubber tire are held or forced apart to expose the ends of the wires which are tightened around the wheel, thereby compressing the rubber on the retaining-wires and pressing it firmly into the rim-channel. The retaining-wires are then held by suitable separated clamps while they are cut to the proper length and their ends united by scarfing and brazing or in any usual manner, after which the wires are disengaged from their holding-clamps and the compressed ends of the rubber tire drawn together and joined.

The object of the invention is to provide a desirable machine of simple, strong, and inexpensive construction for expeditiously compressing the rubber tire, tightening the retaining wires or bands, holding the same while their ends are united, and drawing together the separated ends of the rubber tire to unite the same.

In the accompanying drawings, consisting of two sheets, Figure 1 is a fragmentary front elevation, partly in section, of a rubber-tire-setting machine embodying the invention. Fig. 2 is a plan view thereof. Fig. 3 is a side elevation thereof, partly in section in line 3 3, Fig. 1. Fig. 4 is a fragmentary front elevation thereof, showing the manner of drawing the separated ends of the rubber tire together. Fig. 5 is a detached perspective view of one of the spindles for tightening the retaining-wires. Fig. 6 is a detached perspective view of the wire-clamping sleeve for the tightening-spindle. Fig. 7 is a sectional view showing one of the wire-holding clamps.

Like letters of reference refer to like parts in the several figures.

A represents an upright supporting column or standard which is of tubular or other form. The standard is provided with a suitable base, (not shown,) which is secured to the floor and is preferably held or steadied by a brace $a$, secured to its upper end and to a vertical wall or other solid support.

D represents a support for the wheel to which the tire is to be applied. This support may be of any known or preferred construction, but preferably consists of a horizontal axle or shaft which is adjustably secured to the supporting-standard, so that it can be fixed at different elevations thereon to accommodate wheels of different diameters, by a split clamping-collar $b$, secured to the inner end of the axle and surrounding the supporting-standard, on which it is firmly held by a screw $b'$, passing through the separated ends of the clamping-collar. The axle or shaft is passed through the hub of the wheel to be operated upon, with the inner end of the hub bearing on a conical sleeve $c$, which is adjustably secured to the axle by a set-screw $c'$ or in any other suitable manner. The wheel is held from longitudinal movement on the axle by a removable conical bearing-sleeve $c^2$, which is slipped over the outer end of the axle into the outer end of the hub of the wheel, in which position it is held by a cam-lever $c^3$, pivoted in a slot in the conical bearing-sleeve with its cam-face engaging the axle. The bearing-sleeve is secured or released by swinging the lever so that its cam-face is forced against or moved out of contact with the axle. The cam-lever $c^3$ affords a convenient means for quickly securing and releasing the bearing-sleeve on the axle; but any other suitable means may be employed for this purpose.

E represents a head or frame which is secured to the upper end of the supporting-standard by means of a sleeve $e$ and set-screw $e'$ or in any other suitable manner. The frame projects forwardly from the standard and is provided at its front end with an upright portion $e^2$.

F F', Figs. 1, 4, and 7, represent two separated clamps or devices for holding the ends of the rubber tire separated while tightening the retaining wires or bands and holding the latter while their ends are being connected. The clamps are secured to the frame substantially radial with the wheel-supporting axle and in such position that their lower ends will enter the channel of the wheel-rim when the wheel is adjusted on the axle with the channeled rim beneath the clamps and the axle adjusted to the proper elevation. Each of the clamps consists of a stationary or fixed jaw $f$, which is bolted to the upright front end of the frame, and intermediate and outer movable jaws $f'$ $f^2$, respectively, which are connected to the fixed jaw by a screw $f^3$. The lower ends of the stationary jaw and outer movable jaw of the clamp are reduced, so that they can extend down into the channel of the wheel-rim, and the opposing faces of the several jaws are provided near their lower ends with transverse roughened notches $f^4$ to receive and grip the retaining wires or bands, and above said notches the stationary and outer movable jaws are provided with transverse openings or holes $f^5$, through which the wires can pass freely. The screw $f^3$ passes loosely through smooth holes in the outer and intermediate movable jaws, with its threaded shank working in a threaded hole in the stationary jaw and its head, which is adapted to receive an operating-wrench, bearing against the outer movable jaw. $f^6$ represents a second screw which works in a threaded hole in the outer jaw, with its inner end turning freely in smooth holes in the intermediate and stationary jaws. The clamp is adapted to grasp two parallel retaining wires or bands or a single wire or band. When two wires are employed, they are inserted in the notches between the intermediate and outer jaws and held firmly by tightening the screws of the clamp. When the clamp is to be used for a single wire or band, the intermediate jaw is removed and the wire or band held in the notches in the stationary and outer movable jaws. Clamps of any other suitable construction may be employed.

G G' represent two horizontal rotary winding spindles or shafts to which the opposite ends of the retaining-wires are secured and which are simultaneously rotated to wind the wires thereon, thereby drawing the wires taut around the wheel. The winding-spindles are arranged at opposite sides of the clamps, and each is journaled in bearing-openings in a pair of arms $g$, projecting laterally from the frame E.

The following mechanism is preferably employed for simultaneously rotating the winding-spindles. H represents ratchet-wheels, one of which is secured by a set-screw or otherwise to each of the winding-spindles between its bearing-arms. The ratchet-wheels are arranged oppositely or so that their teeth project in opposite directions. I indicates pawl-levers, each of which is provided with a bifurcated inner end which straddles the adjacent ratchet-wheel and is fulcrumed to oscillate on the winding-spindle between the bearings therefor and the ratchet-wheel. The latter and the pawl-lever prevent endwise movement of the winding-spindle in its bearings. $i$ indicates oppositely-arranged pawls which are pivoted between the separated portions of the bifurcated outer ends of the pawl-levers with their inner free ends engaging the teeth of the ratchet-wheels. K is a hand operating-lever for the pawl-levers. The hand-lever is fulcrumed adjacent to one end on a pivot projecting from an upright lug $k$, rising from the central portion of the frame, and is provided with oppositely-projecting arms $k'$, which are connected by links $k^2$ to the outer ends of the pawl-levers. When the hand-lever is rocked on its fulcrum, the pawl-levers are simultaneously and oppositely oscillated to turn the ratchet-wheels and winding-spindles, to which they are secured, in opposite directions. The ratchet-wheels are held against return movement by holding-dogs L, Figs. 1 and 4, pivoted to depending lugs on the frame and having weighted arms which hold their free ends against the teeth of the ratchet-wheels.

The ends of the retaining-wires can be secured to the winding-spindles in various ways, but the following means is preferably employed for this purpose. Each spindle (see Fig. 5) is provided with a substantially flat longitudinal face $m$, and at its end a portion of said flat face is removed to provide a short flat face $m'$ at an angle to the long flat face $m$. N, Fig. 6, represents a removable clamping-sleeve which is slipped over the outer end of the tightening-spindle. The sleeve is provided at its inner end with a transverse slot $n$, adapted to be turned into a position parallel with the long flat face of the tightening-spindle, and is provided at its outer end with a transverse key or portion $n'$ opposite to the two flat faces $m$ $m'$ at the outer end of the tightening-spindle. The clamping-sleeve is removably retained on the tightening-spindle by a spring-key O, inserted in a hole in the end of the shaft or any other suitable holding device. When the retaining-wires are to be secured to the winding-spindle, the clamping-sleeve is removed therefrom and the ends of the wires placed transversely across the spindle against the long flat face thereof, as indicated in Fig. 5. The clamping-sleeve is then slipped over the spindle in such position that the retaining-wires enter the slot in its inner end and the sleeve is secured on the spindle by the spring-key. The two short flat faces at the end of the spindle permit the latter to turn for a small portion of a revolution in the sleeve, and as the wires tend to hold the sleeve from turning they are firmly gripped or pinched between the long flat face of the spindle and the flat face of the notch in the inner end of the clamping-sleeve. The ends of the retaining-wires are thus held and caused to wind on the sleeves when the spindles are rotated.

The operation of the machine is as follows: The wheel to which the tire is to be applied is placed on the supporting-axle D and the conical bearing-sleeves adjusted to position the channel of the wheel-rim directly under and somewhat below the lower ends of the retaining-wire clamps F F'. The proper length of rubber tire, with the retaining-wires in place therein, with the ends of the wires projecting from the ends of the tire, is placed around the wheel in the channel of the rim, and the left-hand ends of the retaining-wires are passed through the holding-notches $f^4$ at the lower ends of the left-hand clamp F and through the large holes $f^5$ in the right-hand clamp F' and secured to the right-hand winding-spindle G' in the manner before stated, with the left-hand end of the rubber tire abutting against the left-hand clamp. The other ends of the retaining-wires are similarly passed through the holding-notches in the right-hand clamp F', the large holes in the left-hand clamp F, and secured to the left-hand winding-spindle G, with the right-hand end of the rubber tire abutting against the right-hand clamp, as shown in Fig. 1. The wheel-supporting axle is then raised on the supporting-standard until the lower ends of the clamps for the retaining-wires enter the channel of the rim and firmly secured to the supporting-standard. The rubber tire is raised in loops at opposite sides of the clamps and held in place on the rim by rim-clamps P of any suitable construction. The parts will then be in the position shown in Fig. 1. The operating hand-lever K is then rocked back and forth, causing the winding-spindles G G' to turn in opposite directions, winding the retaining-wires thereon, so as to wind the same around the wheel, thereby drawing the rubber tire tightly into the channel. When the retaining-wires are sufficiently tight, the two clamps F F' for the retaining-wires are screwed up to firmly hold the retaining-wires, after which the wires are cut between the clamps to the proper length and their opposite ends joined by scarfing and brazing or in any other suitable manner. After the retaining-wires are joined the clamps are unscrewed to release the retaining-wires, and the wheel-supporting axle D is lowered until the clamps are above the wheel and tire thereon and again fixed on the supporting-standard. A tire-clamp Q, Fig. 4, of any suitable construction, is then connected to one end of the rubber tire and to one of the winding-spindles by a link or arm $q$, after which the wheel is turned by hand on the supporting-axle and the end of the tire drawn to the center of the space between the ends of the tire. The tire-clamp Q is similarly attached to the other end of the rubber tire, and the other winding-spindle and the wheel turned in the opposite direction to draw the other end of the tire up to meet the first end. The ends of the tire are joined by suitable cement which has been previously applied thereto or in any usual manner.

I claim as my invention—

1. The combination of means for supporting the wheel, means for holding the opposite ends of the tire separated, rotatable winding devices to which the opposite ends of the retaining wire or wires are secured and which are located at opposite sides of the point where the ends of the tire are to be joined, a single operating device and connections for turning said winding devices to simultaneously tighten the retaining wire or wires from opposite ends, and means for holding the retaining wire or wires, substantially as set forth.

2. The combination of means for supporting the wheel, means for holding the opposite ends of the tire separated and for holding the retaining wire or wires after they have been tightened, rotatable winding devices arranged on opposite sides of said holding means and to which the opposite ends of the retaining wire or wires are secured, and a hand-actuated device and connections for rotating said winding devices to simultaneously draw the opposite ends of the retaining wire or wires together to tighten the same, substantially as set forth.

3. The combination of means for supporting the wheel, means for holding the opposite ends of the tire separated and for holding the retaining wire or wires after they have been tightened, winding-spindles arranged at opposite sides of said holding means, means for securing the opposite ends of the retaining wire or wires to said spindles, and a ratchet-and-pawl mechanism for simultaneously rotating said spindles to draw the opposite ends of the retaining wire or wires together to tighten the same, substantially as set forth.

4. The combination of means for supporting the wheel, devices for holding the ends of the tire separated and for holding the retaining wire or wires, rotatable winding-spindles arranged at opposite sides of said holding devices, means for securing the opposite ends of the retaining wire or wires to said spindles, and an oscillating lever connected to said spindles for simultaneously rotating the same to tighten the retaining wire or wires from opposite ends, substantially as set forth.

5. The combination of means for supporting the wheel, devices for holding the ends of the tire separated and for holding the retaining wire or wires, rotatable winding-spindles, means for securing the opposite ends of the retaining wire or wires to said spindles, an oscillatory lever, and ratchet-and-pawl mechanisms actuated by said lever for simultaneously rotating said spindles to tighten the retaining wire or wires from opposite ends, substantially as set forth.

6. The combination of means for supporting the wheel, devices for holding the ends of the tire separated and for holding the retaining wire or wires, rotatable winding-spindles, means for securing the opposite ends of the retaining wire or wires to said spindle, ratchet-wheels secured to said spindles, pawl-levers provided with pawls coöperating with said ratchet-wheels, and a single operating-lever connected to said pawl-levers for simultaneously rotating said spindles, substantially as set forth.

Witness my hand this 7th day of July, 1903.

JOHN M. SWEET.

Witnesses:
CHAS. W. PARKER,
C. M. BENTLEY.